Dec. 19, 1950  R. R. CROOKSTON  2,534,700
AUTOMATIC WEIGHT CONTROL DEVICE
Filed Jan. 13, 1949  3 Sheets-Sheet 1
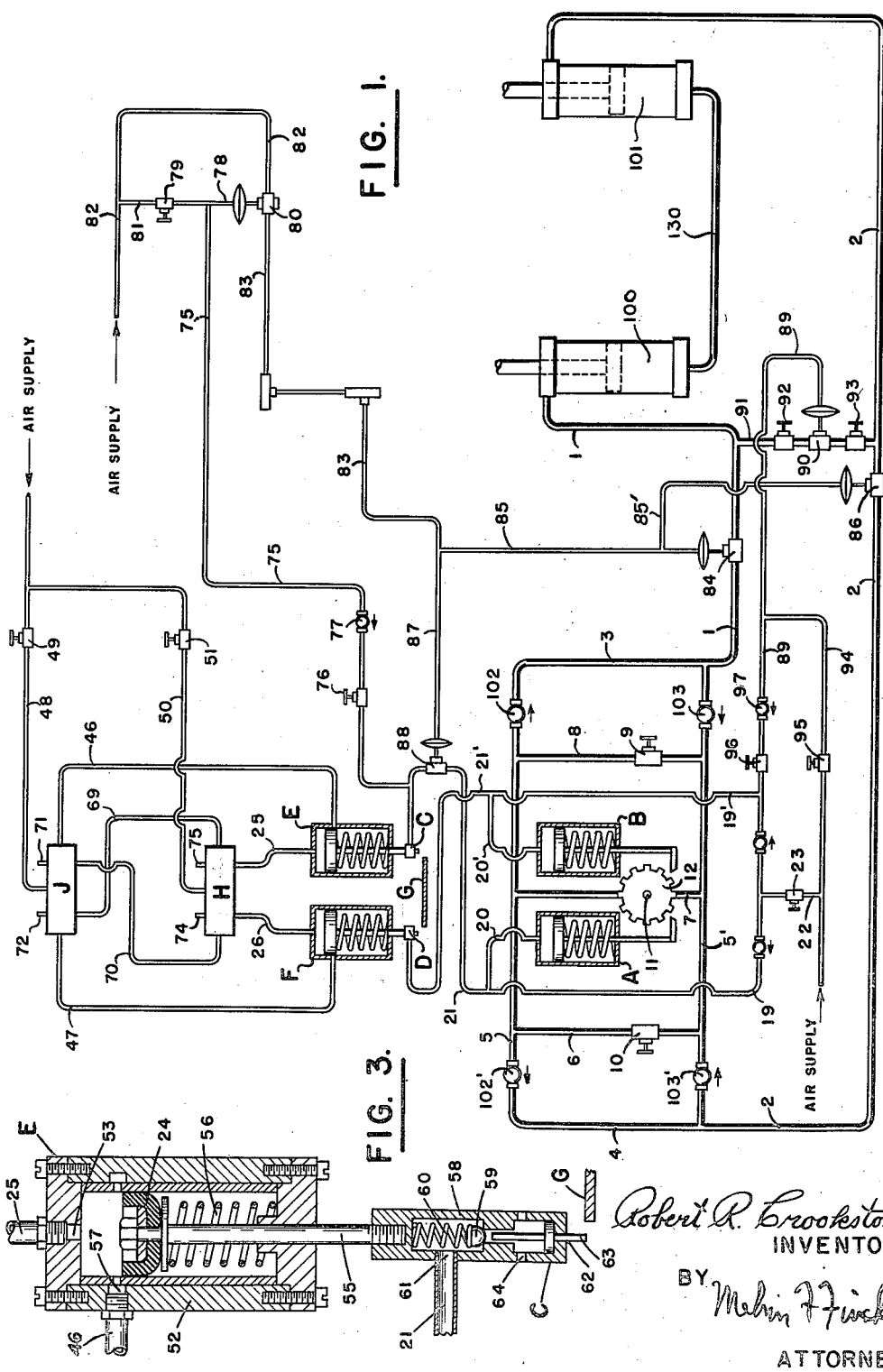
Robert R. Crookston,
INVENTOR.
BY Melvin F. Finch
ATTORNEY.

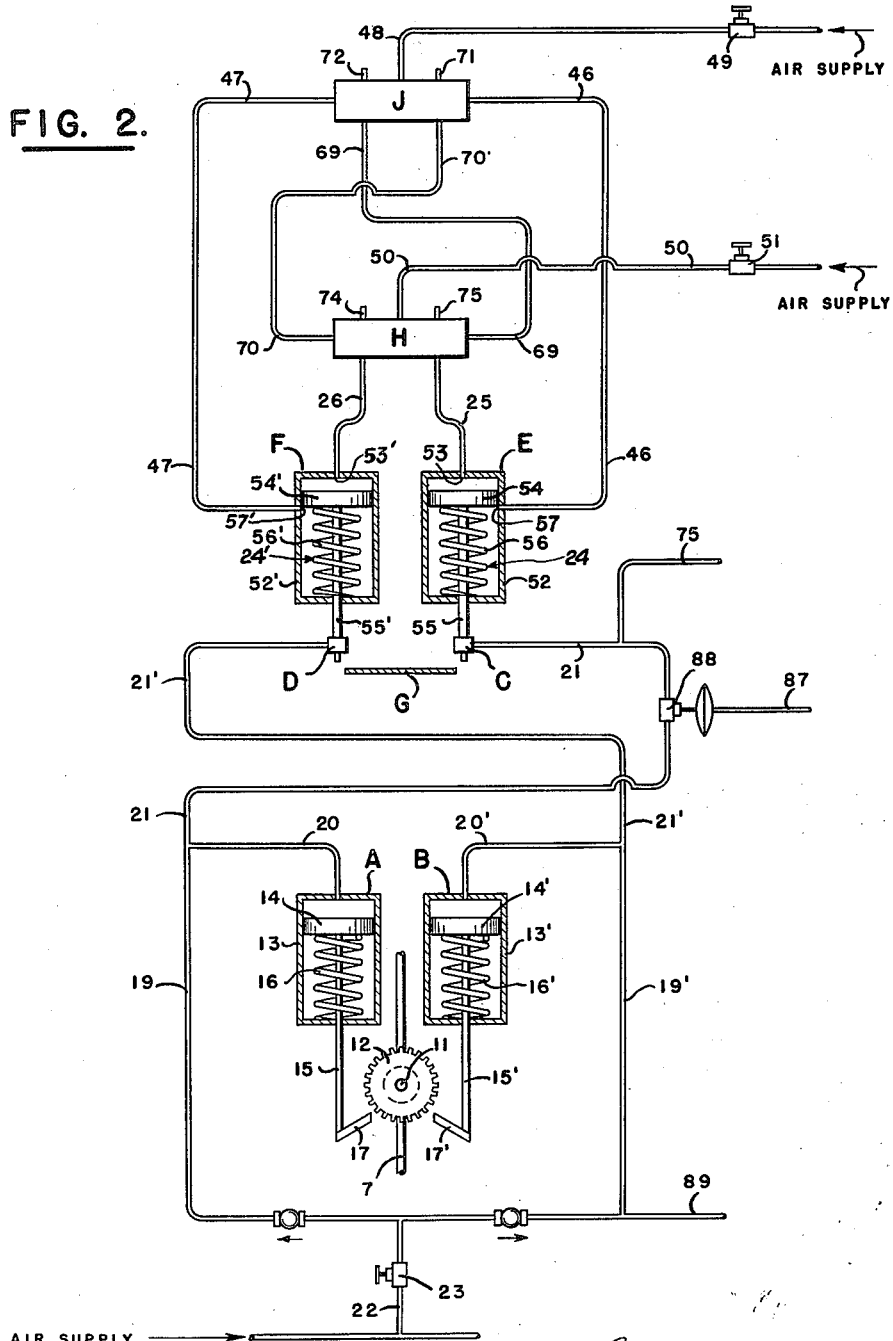

Dec. 19, 1950 R. R. CROOKSTON 2,534,700
AUTOMATIC WEIGHT CONTROL DEVICE
Filed Jan. 13, 1949 3 Sheets-Sheet 3
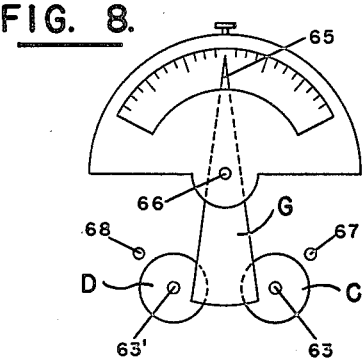
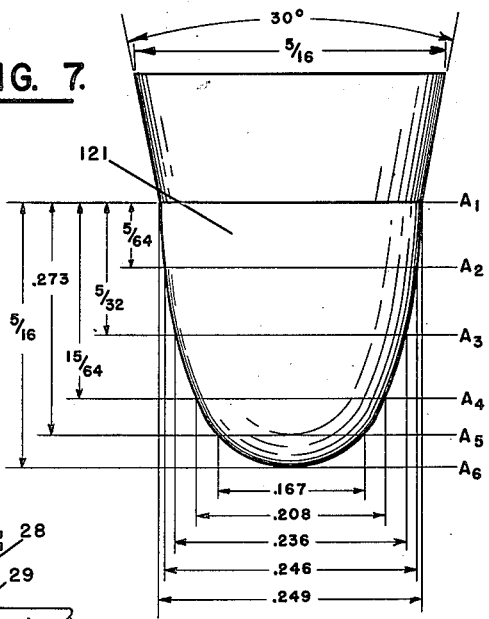
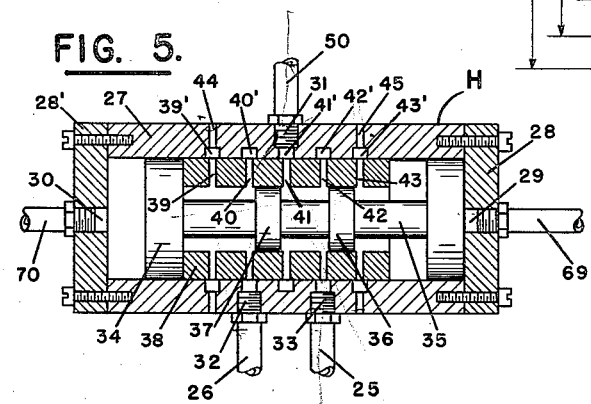
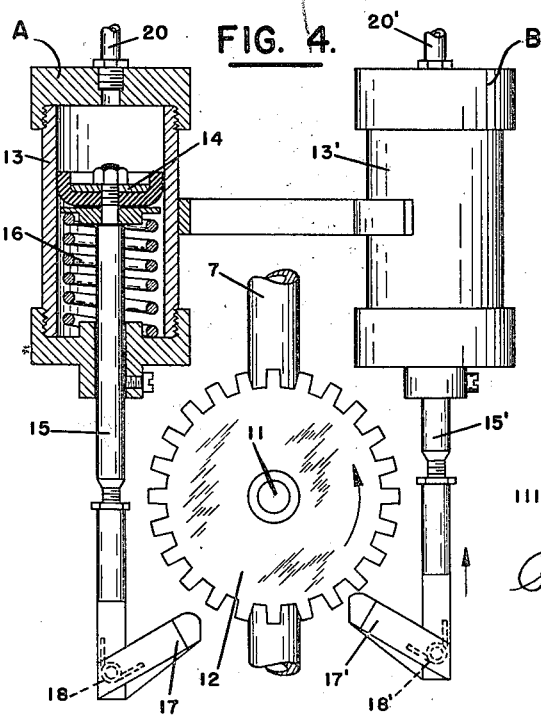
Robert R. Crookston, INVENTOR.
BY Melvin F. Fincke
ATTORNEY.

Patented Dec. 19, 1950

2,534,700

UNITED STATES PATENT OFFICE 2,534,700

AUTOMATIC WEIGHT CONTROL DEVICE

Robert R. Crookston, Houston, Tex., assignor, by mesne assignments, to Standard Oil Development Company, Elizabeth, N. J., a corporation of Delaware Application January 13, 1949, Serial No. 70,765

11 Claims. (Cl. 137—139)

The present invention is directed to a method for automatically controlling a variable and to an automatic control mechanism.

It is frequently desirable to provide a means for automatically controlling a unit in response to a signal. In order to accomplish this purpose a number of automatic control systems have been devised. A well known means for exercising such a control is the rotating pendulum or "fly-ball" governor on a steam engine which varies the amount of steam supplied to the engine as a function of the speed of rotation of the engine. It will be understood that the governor on an engine is simply an example typifying a large number of control systems.

Heretofore many control systems employed have suffered the disadvantage of causing or allowing more or less hunting time in the operation of the variable to be controlled. By "hunting" is meant a tendency to continually produce a greater correction than is necessary with the result that the variable to be controlled fluctuates first on one side and then on the other side of a desired control point. The conventional fly ball governor provides an excellent example of the aforementioned phenomenon. Such a governor is mounted so that its spindle and masses revolve at a rate proportional to the rotative speed of the engine to be controlled. The governor is connected by means of a system of levers to a valve supplying steam to the engine in such manner that when the governor masses are rotated above a predetermined speed, the governor tends to close the valve and when the governor is rotating below the predetermined speed, the governor tends to open the valve. It will thus be appreciated that the governor is exerting a continuous corrective influence on the valve controlling the supply of the steam to the engine. Inasmuch as the governor is mechanically connected to the valve there are frictional losses in the intervening mechanism. These frictional losses in turn produce a time lag between the signal mechanism, in this case the rotating masses, and the correction applied to the valve. Thus, the conventional fly ball governor has a tendency to close the steam valve more than necessary when the engine exceeds the predetermined speed which in turn causes the engine speed to drop below the desired level. Similarly, when the engine speed is lower than the desired value, the governor has a tendency to open the valve more than necessary which, in turn, causes the engine to exceed the desired speed. Because of this tendency to overcorrect, an engine controlled by a conventional fly ball governor is continually varying in speed and is usually either above or below the desired speed.

Another mechanism which exhibits the phenomenon of hunting is a thermocouple which is poorly located with respect to the heat source being controlled. Thus, when a poorly located thermocouple is employed to control the output of a heater used for heating a confined space, the temperature in the confined space will rarely remain at the desired point but rather will be above or below this point. For example, if the temperature in the confined space is below the desired point, the thermocouple causes the heater to supply additional heat. Inasmuch as there is a lag in the response of the thermocouple to the influence of the additional heat until after more than sufficient heat has been supplied to heat the confined space to the desired value, the temperature of the confined space will normally exceed the desired point before the thermocouple reduces the amount of heat supplied by the heater. A similar situation is also encountered when the temperature in the confined space is above the desired point. Here again the hunting is a result of the lag between the corrective influence and the response of the signal to the influence as well as of the continuous nature of the corrective influence.

A feature common to prior art means for automatically controlling a unit in response to a signal is that such means are arranged to supply a continuous corrective influence in response to a signal. The tendency to "hunt" is implicit in such mechanisms inasmuch as there is a time delay between the application of the correction and the response of the signal thereto.

It is an object of the present invention to provide a method for controlling a variable which substantially eliminates the phenomenon of hunting. It is a further object of the present invention to provide a signal activated, automatic control means which is substantially free from hunting effects with respect to the variable controlled. It is a further object to provide a system of making definite, predetermined, finite, corrective adjustments so timed that the effect of each adjustment is felt before a subsequent adjustment is applied. Another object is to provide a method of making orifice area adjustment ratios as great as 10,000/1 by annular positioning of the valve stem controlling the orifice area regardless of system friction.

The invention of the present application may be described briefly as a method for controlling a variable in such manner that the corrections applied will not get prohibitively ahead of the signal. Rather than applying a correction continuously, as is taught by the prior art, repeated corrections are intermittently made. The time elapsing between corrections is delayed in such manner that the correction is given an opportunity to be felt by the signal before an additional correction is made. In this manner interrupted adjustments, controllable both as to frequency and magnitude, are made.

The control means which I employ is adapted to operate through a cycle and to cause only a predetermined increment of control through each cycle, if activated by a signal. An ample opportunity is provided for this control means to produce its effect on the system being controlled before the succeeding cycle allows another increment of control to be applied. This arrangement substantially eliminates hunting or overcontrol inasmuch as it assures that only a predetermined adjustment will be made in each cycle of operation of the control means. It will thus be obvious that the control means in my invention substantially prevents hunting in spite of a lag between the application of the corrective influence and the response of the signal to the influence.

More particularly, my invention may be described as comprising a pair of prime movers adapted to rotate a valve stem controlling the valve orifice, one of said prime movers being adapted to rotate the valve stem in a clockwise direction and the other of which is adapted to rotate the valve stem in a counter-clockwise direction. The prime movers are so arranged as to rotate the valve stem by a predetermined finite amount and at regular intervals controlled as to frequency. Each of the prime movers are arranged to be activated by a signal and the frequency of operation of each prime mover is so fixed as to permit the adjustment made in the valve setting to be felt by the system to be controlled before a subsequent adjustment is made. Not only does my invention substantially eliminate the hunting characteristic of the prior art devices used for controlling a mechanism in response to a signal, but it also permits the fixing of effective orifice area adjustment ratios as great as 10,000/1. This is because orifice area adjustments are made by rotating the valve element a predetermined, finite amount rather than by linear motion of the orifice area controlling mechanism. Commercial diaphragm controlled valves have linear motion and work satisfactorily only through about the upper 90% of their positional ranges and afford effective orifice area ratios of about 100/1 which, of course, means control to about 1%. In contrast, the control mechanism of my invention permits control to about 0.01%.

The device of the present invention is particularly adaptable for use in controlling the rate of operation of the mechanism described and claimed in U. S. Patent 2,489,449 entitled "Brake Assembly," issued November 29, 1949 to Robert R. Crookston, although it is also suitable for use with any kind of mechanism in which the rate of operation depends or can be made to depend on the flow of a fluid through an orifice adjustable by means of a rotatable element. My device may be used in conjunction with, for example, the Brantly or Fisher systems, the former well known commercially.

In U. S. Patent 2,489,449 a means adapted for paying off the line of a rotative drum is disclosed with the rate of rotation of the drum controlled by adjusting the opening of a valve in a hydraulic conduit forming a portion of the assembly. When the assembly of U. S. Patent 2,489,449, aforesaid, is employed for drilling by the rotary drilling method, the operator can control the rate of the paying out of the line from the rotative drum by adjusting by hand the aforementioned valve. When the valve has been so adjusted, the operator can permit drilling to continue without further adjustment only so long as the strata being drilled through provides uniform resistance to drilling. When a strata is reached which offers greater resistance to drilling, the weight on the drill bit increases and consequently the operator must reset the aforementioned valve to conform to the altered condition. Consequently, it is desirable to adjust the rate of rotation of the hoisting drum in response to the amount of weight allowed to rest on the drill bit when the assembly of U. S. Patent 2,489,449, aforesaid, is employed for drilling by the rotary drilling method.

When drilling boreholes of the depth conventionally required to penetrate commercially valuable oil producing formations, the weight of the drill stem required for drilling the major portion of the hole is greater than the weight which may be placed on the drill bit. Accordingly, it is customary to use the drilling line for supporting the excess weight of the drill stem. It will be understood that as the drilling proceeds, the hole is continually deepened so that it is necessary to pay out line to exert the desired amount of weight on the drill bit.

The control means of the present invention is particularly adapted for use with the mechanism of U. S. Patent 2,489,449, aforesaid, in automatically controlling the setting of the valve on the hydraulic line controlling the rate of rotation of the drum, said valve setting being controlled as a function of the weight on the drill bit transmitted to the device as the controlling signal.

Other objects and advantages of the present invention will be seen from a reading of the following description taken in conjunction with the drawing in which Fig. 1 is in the form of a schematic showing of the component parts of an embodiment of the control device of my invention in their cooperative relationship with each other;

Fig. 2 is in the form of a schematic showing of a portion of the embodiment of the device of my invention shown in Fig. 1;

Fig. 3 is a cross-sectional view of a bleeder valve and the air motor which reciprocates a valve shown in Figs. 1 and 2;

Fig. 4 is a front elevation, partially in cross-section, of the motor assembly actuating the rotatable member to be controlled together with the rotatable member shown in Figs. 1 and 2;

Fig. 5 is a cross-sectional view of the master valve shown in Figs. 1 and 2;

Fig. 6 is a cross-sectional view of a control valve of one embodiment of my invention;

Fig. 7 is a dimensionalized elevation of the valve tip of the valve shown in Fig. 6; and Fig. 8 is a front elevation of a signal mechanism shown diamgrammatically in Fig. 2 for registering the value of the variable to be controlled.

Turing now specifically to the drawing, it will be seen that individual parts are designated by numbers and groups of parts or assemblies are designated by letters, like numerals and like letters indicating corresponding parts and assemblies respectively throughout.

The device is arranged to control a rotatable member 11 which, for example, may be the stem of a valve 11'. Mounted on the rotatable element 11 is a toothed wheel 12.

A first activating assembly A is arranged to move wheel 12 in a clockwise direction and a second activating means B is arranged to move wheel 12 in the opposite or counter-clockwise direction. Bleeder valves C and D are fluidly connected to activating means A and B, respectively. An air motor E is arranged to reciprocate bleeder valve C and air motor F is arranged to reciprocate bleeder valve D. A pointer or needle assembly G is arranged to receive a signal from a suitable source and is mounted to assume a neutral position out of contact with said bleeder valves C and D as the valves reciprocate and to move from its neutral position to a first position where it activates bleeder valve C during a portion of the cycle of the motor E and is also adapted to be moved from its neutral position to a second position where it activates bleeder valve D during a portion of the cycle of the air motor F.

Activating means A consists of a cylinder 13 having a piston 14 slidably arranged therein with a piston rod 15 projecting through the rod end of the cylinder. A spring 16 is arranged within the cylinder to bias the piston away from the rod end. Piston rod 15 is attached to pawl 17 having a free end adapted to engage with teeth on toothed wheel 12. Pawl 17, held in an extended position by spring 18, is arranged to contact toothed wheel 12. An inlet line 19 is arranged to discharge into cylinder 13 through line 20 and is also fluidly connected with bleeder valve C by means of line 21, part of which consists of flexible tubing.

Activating means B consists of cylinder 13' with piston 14' slidably arranged therein and attached to piston rod 15' projecting through the rod end of the cylinder. A spring 16' is mounted to bias piston 15' away from the rod end of the cylinder. Piston rod 15' is attached to pawl 17' having a free end adapted to engage with teeth on toothed wheel 12. Pawl 17' is pressed into contact with toothed wheel 12 by means of spring 18'. An inlet line 19' is arranged to discharge into cylinder 13' through line 20' and is also fluidly connected with bleeder valve D by means of line 21', part of which consists of flexible tubing. Lines 19 and 19' are connected through line 22, which contains an adjustable orifice 23, to a suitable source of fluid under pressure, such as compressed air, not shown on the drawing.

Motors E and F may be conventional reciprocating motors powered by a supply of fluid under pressure, such as compressed air. Motor E has a reciprocating element 24 upon which is mounted vent valve C and similarly motor F has a reciprocating element 24' on which is mounted vent valve D. The power for operating motor E is supplied by inlet line 25 and similarly the power for operating motor F is supplied by inlet line 26.

The power supplied through line 25 for operating motor E and the power supplied through line 26 for operating motor F is controlled by valve H, hereinafter referred to as a master valve. Although, in the practice of my invention, any four-way valve of suitable design may be used, I prefer to employ a valve which consists of a cylindrical housing 27 having closed ends 28 and 28', the said ends defining ports 29 and 30 respectively and the said cylindrical housing 27 defining an inlet port 31 located equidistant from each end at its longitudinal center and defining outlets 32 and 33, each of said outlets being located 180° radially from said inlet port 31 and located equidistant from the longitudinal center of said housing. Located within cylindrical housing 27 is double headed piston 34 slidably arranged therein designed to be reciprocated by the alternate application of pressure on its two respective faces. The two piston heads are rigidly connected with each other by means of rod 35 on which are rigidly mounted two port closure projections 36 and 37, the said two projections being designed to move slidably within cylinder sleeve 38. Cylinder sleeve 38 is rigidly mounted on the interior walls of cylinder housing 27 and contains five series of spaced ports numbered 39, 40, 41, 42 and 43, each series being arranged longitudinally with respect to each other, the said series of ports being fluidly connected with annular grooves located in cylinder housing 27 numbered 39', 40', 41', 42', and 43', respectively. Annular grooves 39' and 43' are fluidly connected with the atmosphere by means of ports 44 and 45 in cylinder housing 27.

Master valve H is designed to supply air to motors E and F alternately so as to cause the said motors to reciprocate alternately. This is accomplished by arranging master valve H so that air supplied through inlet port 31 can fluidly communicate with motor E through outlet 33 but cannot simultaneously communicate fluidly with motor F, and conversely when air is being supplied to motor F through port 32, it is excluded from motor E. In order to accomplish this purpose slidable piston 34 is arranged to assume two different positions which will be designated respectively as a first position and a second position. When air is supplied through port 30, piston 34 is driven to the end of cylinder housing 27 opposite from the end defining port 30 which position will hereafter be designated as the first position. In this first position air supplied to master valve H through inlet 31 flows through annular groove 41' through the series of ports 41 into the space between port closure projections 36 and 37, through the series of ports 42, into groove 42', through outlet 33 into line 25 where it impinges upon the head end of slidable element 24 in motor E. When piston 34 is in this position, air being supplied through inlet port 31 is blocked off from outlet port 32 by means of projection 37 and consequently no air can be supplied to motor F. However, while in this position the air exhausted from the head end of motor F through line 26 blows upwardly through outlet 32, through annular groove 40', through the series of ports 40, through the series of ports 39, through annular groove 39', and through exhaust port 44. When piston 34 is driven to its second position by the application of fluid pressure through port 29, air is supplied to the head end of motor F and air is allowed to exhaust simultaneously from motor E through line 25, in a similar manner as described above when piston 34 was in its first position. Fluid for driving piston 34 from its first position to its second position may be supplied by connecting line 46 with port 29 and fluid for driving piston 34 from its second position to its first position may be supplied by fluidly connecting line 47 with port 30. However, in the practice of my invention, I prefer to supply the air to ports 29 and 30 through pilot valve J, the said pilot valve also being a four-way valve similar in design to master valve H. The purpose in employing a pilot valve is to reduce the possibility of the assumption of a neutral position by master valve H. It will be understood, however, that master valve H is designed to supply air to cause alternate reciprocation of the reciprocating members of motors E and F irrespective of whether pilot valve J is employed. Compressed air is supplied to pilot valve J through line 48 containing needle valve 49 from a supply, not shown, maintained at substantially constant pressure. Master valve H is also fluidly connected with the said supply of compressed air by means of line 50 containing needle valve 51. Thus, valve 51 provides primary speed control while valve 49 provides secondary control.

Motor E consists of a cylindrical casing 52 closed at both ends containing reciprocating element 24 therein. The head end of cylinder casing 52 defines port 53 which is fluidly connected with master valve H by line 25. Reciprocating element 24 consists of piston head 54, piston rod 55 arranged to pass slidably through a port defined by the lower end of casing 52 and terminating at its lower end and outside of cylinder casing 52 is valve assembly C. Piston spring 56 is arranged to bias piston head 54 upwardly toward the head end of cylinder casing 52. Port 57 is located in the cylindrical wall of cylinder casing 52 near its head end and may be fluidly connected with master valve H, if no pilot valve is used, but which is connected with pilot valve J when such a valve is used in the practice of my invention. When air is supplied to motor E through line 25 and port 53, reciprocating element 24 is driven downwardly until a point in the stroke is reached where port 57 is open to the passage of fluid from the space inside the cylinder above piston head 54 at which time the said fluid flows through port 57 and through line 46, thereby actuating master valve H which cuts off further supply of air to motor E, thus permitting reciprocating element 24 to return to its original position at the top of its stroke.

Motor F is designed and operates similarly to motor E, it being remembered, of course, that motors E and F reciprocate alternately; that is, when the slidable member contained in one is at the bottom of its stroke the slidable member in the other is at the top of the stroke.

Vent valves C and D may be of any suitable design which will cause the valve to be opened during a portion of the cycle of reciprocating motors E and F, respectively, when an activating signal is given. In the drawing, vent valve C is shown as consisting of a casing 58 defining a seat against which a valve element 59 is biased by spring 60. Line 21, fluidly connecting bleeder valve C with motor A, discharges into casing 58 through port 61. Casing 58 defines an opening 62 through which projects plunger 63 and also defines vents 64. It will be seen that when valve element 59 is forced away from its seat, fluid may pass from inlet line 21 through port 61 of casing 58 and out of the casing by means of fluid vents 64'. Bleeder valve D is designed and operates similarly to bleeder valve C.

It will be understood that as the motors E and F reciprocate, bleeder valves C and D move toward and away from the head ends of the air motors E and F, respectively.

Discharge of air through bleeder valve C or D cause reciprocation of motor A or B, respectively, which, in turn, move toothed wheel 12 through an arc to rotate member 11 to alter the adjustment of the selected variable. When bleeder valve C is opened to allow the discharge of air through fluid vent 64, the air pressure within cylinder 13 is lowered so that the bias exerted by spring 16 is sufficient to move piston 14 away from the rod end of cylinder 13 which, in turn, moves piston rod 15 and pawl 17 to move toothed wheel 12 through an arc in a clockwise direction. When vent valve C then closes, air pressure again builds up inside cylinder 13, thereby pushing piston 14 toward the rod end of cylinder 13 and returns pawl 17 to its initial position ready to be activated when the pressure inside casing 13 is against diminished. Similarly, the bleeding of air through vent valve D allows pressure in casing 13' to diminish whereby piston 14' is forced away from the rod end of cylinder 13' by spring 16' and, in turn, activates pawl 17' which moves toothed wheel 12 is a counterclockwise direction. In other words, motors A. E and bleeder valve C cooperate when activated to move toothed wheel 12 in a clockwise direction while motors B, F and bleeder valve D cooperate when activated to move toothed wheel in the counterclockwise direction.

The means which cause bleeder valves C and D to open to discharge fluid therefrom is needle assembly G shown in the drawing (see Fig. 8) as indicator needle 65 suitably mounted, as on a pivot 66 for movement through a limited arc. Pivot 66 is mounted on the frame which also carries stops 67 and 68 for limiting the angular movement of indicator needle 65. Needle assembly G is a remote indicating station of a commercial weight indicator that preferably registers net weight on bottom although this assembly also is adaptable for attachment to any suitable damped weight indicator, such as, for example, a commercial weight indicator that registers weight of the string.

When needle 65 registers the desired bottom weight, it is in neutral position and reciprocating elements 24 and 24' reciprocate freely and valve elements 59 and 59' remain in their respective seats; consequently, no bleeding takes place and no adjustment is made of rotatable element 11. When needle 65 registers other than the desired bottom weight, the needle either moves from neutral position to first position into the path of plunger 63 of bleeder valve C or from neutral position to second position into the path of plunger 63' of bleeder valve D and consequently the said plunger impinges upon the said needle, causing either valve element 59 or 59' to be pressed from its seat; this in turn causes bleeding, thereby actuating either motors A or B, and causing rotatable element 11 to be turned by one notch of toothed wheel 12. If needle 65 remains in the path of the plunger of valve element 59 or 59', during the next cycle of motors E and F, the plunger of said element again impinges upon the needle and toothed wheel 12 is turned another notch. Thus, motors A or B, as the case might be, continue to make corrective adjustments if needle 65 remains in the path of the plunger of valve element 59 or 59' during subsequent strokes of reciprocating elements 24 or 24', respectively, and makes subsequent adjustments until the bottom weight is corrected to the desired value. In this manner the apparatus of my invention controls rotatable element 11 in such a manner as to maintain essentially the bottom weight selected by the operator.

To avoid erratic control, the above mentioned stops 67 and 68 have been incorporated in this device to assure that the needle 65 cannot stroke past the path of the plunger of bleeder valve C or D. Instead of using stops, any other means may be used to prevent needle 65 from swinging past the path of the said plungers. This may be accomplished, for example, by making the needle sufficiently wide so that it cannot stroke past the plungers. Other means may also be employed but I prefer to use stops.

The apparatus hereinbefore described is very effective in automatically controlling a unit in response to a signal without substantial hunting when the number of corrective adjustments required are limited in number. In many instances, therefore, this apparatus will fulfill its purpose with a high degree of effectiveness, particularly when the variable to be controlled fluctuates over a relatively narrow range. I have found, however, that when the variable to be controlled fluctuates over a very broad range, additional apparatus which supplements the corrective adjustments of the hereinbefore described apparatus may be employed with effectiveness. For example, I have found that when the hereinbefore described apparatus is used in controlling the rate of operation of the mechanism described and claimed in U. S. Patent 2,489,449, supplementary equipment may be used to advantage. As previously mentioned, the brake assembly described and claimed in the aforementioned application is adapted to be employed in conjunction with a rotary drilling rig wherein it is used to pay-off line from the draw works. The mechanism of the present application hereinbefore described is adapted to control the rate of pay-off of the drilling line in response to a signal supplied by any conventional weight indicator. When drilling through a formation of relatively uniform hardness the hereinbefore described mechanism of itself satisfactorily controls the rate of pay-off of the drilling line so as to maintain a relatively uniform weight on bottom. As pointed out in the preceding description, this apparatus is adapted to make corrections of a predetermined magnitude during cycles of a predetermined length. Such a device is, therefore, eminently suited for maintaining a relatively constant weight on the bottom when drilling formations of relatively uniform hardness. However, it will be appreciated that in normal drilling operations broken formations are encountered and further that the borehole will pass through formations relatively hard in character into formations much softer in character and, vice versa, there will be times when the borehole penetrates very soft formations and enters very hard formations. It will be further appreciated that any quick transition from hard to soft drilling or from soft to hard drilling necessitates very rapid changes in the rate of pay-off of the drill line if the weight on bottom is to be maintained at a relatively constant value. Inasmuch as the hereinbefore described apparatus is specifically adapted to make small spaced corrective changes, it will be appreciated that when a quick transition in the character of the formation being drilled occurs the hereinbefore described apparatus must necessarily make a long series of corrective changes before the weight on bottom is restored to the desired value. Inasmuch as it is desirable to maintain the weight on the bottom within reasonable constant limits at all times, it will be appreciated that supplementary equipment may desirably be employed for quickly restoring the weight on bottom to the desired value. I have found that when the drill stem passes from a relatively soft to a hard formation, a device which will implement the hereinbefore described mechanism, after the mechanism has made a fixed number of corrective adjustments, may desirably be employed. This is especially true when drilling is proceeding at medium or low speeds. I have therefore provided a supplementary device which, after the hereinbefore described invention has completed a fixed number of cycles, preferably approximately four, will completely prevent further pay-off of the drilling line until such time as the weight on bottom has been restored to the desired value, at which time the hereinbefore described mechanism assumes the duty of maintaining the weight on bottom at the desired value while the supplementary mechanism hereinafter described simultaneously ceases to operate until the weight on bottom again becomes excessive.

Referring now to Fig. 1 of the drawing, conduit 75 is fluidly connected with conduit 21, adjustable needle valve 76 controls the rate of flow of fluid through line 75 while check valve 77 permits fluid to flow therethrough to the left, as shown by the arrow, and prevents fluid from flowing therethrough to the right. Line 75 is fluidly connected with line 78 between needle valve 79 and the diaphragm of diaphragm valve 80. Conduit 81 fluidly connects needle valve 79 to conduit 82 which, in turn, is connected to a suppy of fluid, such as air, under constant pressure. Conduit 83 fluidly connects diaphragm valve 80 through branch line 85 with the diaphragm of diaphragm valve 84. Branch line 85 also fluidly connects conduit 83 through branch line 85' with the diaphragm of diaphragm valve 86. Diaphragm valves 84 and 86 control the flow of fluid through conduits 1 and 2. Branch line 87 fluidly connects conduit 83 with the diaphragm of diaphragm valve 88 located in line 21. Conduits 1 and 2 are fluidly connected with conduit 5 by means of conduits 3 and 4. Conduit 5' also fluidly connects conduit 3 and conduit 4. Conduits 5 and 5' are fluidly connected to form a manifold by means of conduits 6, 7 and 8. Valves 10, 11' and 9 control the flow of fluid through conduits 6, 7 and 8, respectively. Check valve 102 in line 5 permits fluid to flow through itself to the right only while check valve 102' permits fluid to flow therethrough to the left only. Check valve 103 in line 5' permits fluid to flow through itself to the left only while check valve 103' permits fluid to flow therethrough to the right only.

Having described in detail the various parts of the device used for preventing pay-off of drill line when the weight on bottom becomes excessively high, the mode of operation of this device will now be fully described.

When the signal indicates that the weight on bottom exceeds the desired value needle G will move into the path of bleeder valve C carried on the piston rod of motor E. With each stroke of air motor E the plunger 63 of bleeder valve C strikes needle G and bleeder valve C bleeds air from line 21 and motor A, thus causing motor A to reciprocate and rotate rotatable element 11. Simultaneously bleeder valve C bleeds air from line 75 and consequently from the diaphragm of valve 80, the amount of air so bled being controlled by previously adjusted valve 76. Needle valves 23, 76 and 79 are adjusted so that if the weight on the bit as indicated by the signal has not been corrected by the time air motor A has taken some desired number of consecutive strokes, for example four, line 75 and the diaphragm of valve 80 will be sufficiently emptied of fluid to permit valve 80 to open, thus causing fluid to flow through conduits 83, 87, 85, and 85' to the diaphragms of valves 84, 86 and 88, thus closing these valves. Diaphragm valves 84 and 86, when closed, stop the flow of hydraulic fluid in the walking brake feed-off system and consequently any further feed-off of the drilling line is prevented until the aforementioned valves are again open.

Valve 88, when closed, prevents motor A from operating if the bleeder valve C bleeds air. In this manner valve 88 prevents motor A from making successive strokes and consequently motor A cannot rotate rotatable element 11. Valves 84, 86 and 88, once closed, are held in that position by successive strokes of air motor E through bleeder valve C keeping the diaphragm of valve 80 empty until such time as the desired weight on the bit has again been attained at which time bleeder valve C stops bleeding fluid from the diaphragm of valve 80, permitting it to close, thus opening valves 84, 86 and 88. After valves 84, 86 and 88 are open, air motor A is again ready to rotate rotatable member 11 any time the desired weight gets too great.

As previously mentioned, drilling may proceed through a hard formation into a soft formation. When a rapid transition of this nature occurs, the weight on bottom quickly becomes less than that desired. A mechanism will now be described which assists and supplements my hereinbefore described automatic weight control device. Referring again to the drawing and specifically to Fig. 1, conduit 89 fluidly connects line 19' with the diaphragm of diaphragm valve 90 located in by-pass conduit 91 which fluidly connects conduit 1 at a point between valve 84 and cylinder 100 with conduit 2 at a point between valve 86 and cylinder 101, the cylinders 100 and 101 constituting a portion of the brake assembly described in U. S. Patent 2,489,449. Located on either side of valve 90 in conduit 91 are needle valves 92 and 93. Conduit 94 fluidly connects conduit 89 with conduit 22 which is connected with a source of compressed fluid under constant pressure. The flow of fluid in conduit 94 is controlled by needle valve 95 while the flow of fluid in conduit 89 is controlled by needle valve 96 and check valve 97 which permits fluid to flow through itself to the left only.

Having enumerated the parts constituting my "quick application of weight mechanism," its mode of operation will now be described.

When the weight on bottom drops below the predetermined desired value, each stroke of air motor F will cause bleeder valve D to impinge upon needle G and to bleed air from motor B and diaphragm valve 90 causing motor B to stroke and rotate rotatable member 11. Needle valves 23, 95, and 96 are adjusted so that if the weight on the bit as indicated by the signal has not been corrected by the time air motor B has taken some desired number of consecutive strokes, for example four, the diaphragm of diaphragm valve 90 will be sufficiently emptied of fluid to permit diaphragm valve 90 to open momentarily, which permits hydraulic fluid to flow through by-pass conduit 91 in addition to that which flows through valve 11', thus causing my walking brake mechanism to pay off line at a faster rate than could be accomplished if valve 11' were alone employed for this purpose. The rate of pay-off of the line from the drum is determined by the prior adjustment of either valve 92 or 93. Fluid present in cylinders 100 and 101 below the pistons mounted therein is free to flow from one cylinder and the other through interconnecting conduit 130. The aforedescribed process is continued for each stroke of air motor E until the weight on bottom again reaches the desired value at which time the weight control mechanism assumes its normal operation.

As previously pointed out, rotatable element 11 may comprise the valve stem of valve 11' and is adapted to be rotated a definite predetermined amount in each cycle of the operation of motors A and B. Although any valve carrying a rotatable valve stem may be used, the change of rate of flow of fluid through the conduit controlled by the valve stem will be determined, for any given, finite, valve stem positional adjustment, by the change in area of the valve orifice. Thus, if a conventional needle valve is employed, the orifice area of valve 11' is altered by a fixed amount on rotation of rotatable element 11 during each successive cycle of air motor A or B. However, each successive change in orifice area, being constant in magnitude, differs in percentage of effectiveness as compared to every other change in orifice area. When, however, it is desired to automatically control the setting of the valve in the hydraulic line controlling the rate of rotation of the drum of the mechanism of U. S. Patent 2,489,449, I prefer to employ a valve which gives geometrically progressive control of the fluid flowing through the said hydraulic line. With this type of valve rotation of valve stem 11 through each cycle of the control mechanism of my invention produces a change in orifice area, such that each successive positional change of stem 11 produces a change in orifice area which is constant percentage-wise over the previous setting. With such a valve, each positional adjustment of valve stem 11 means the same in percentage of effectiveness irrespective of whether drilling is being accomplished at high or low rates or at shallow or great depths. Orifice areas exposed by the rotation of valve stem 11 through each subsequent cycle or of a fixed number of cycles of air motors A or B may be represented by the formula:

$$A_2 = A_1(1+C);$$
$$A_3 = A_2(1+C) = A_1(1+C)^2;$$
$$A_4 = A_3(1+C) = A_2(1+C)^2; \text{ etc.}$$

The "C" in the above formula represents a constant which may have any given value, either large or small as compared to the value of $A_1$, the value of the constant being dependent, of course, upon the form given to the tip which moves in and out of the orifice.

The valve 11' which I prefer to employ with the mechanism of my co-pending application, Serial No. 691,486, now Patent No. 2,489,449, is shown in detail in Figs. 6 and 7 of the drawing. Referring to these figures, numeral 11 designates the valve stem of valve 11' and 12 designates the wheel mounted on valve stem 11. Wheel 12 may be secured to stem 11 by any suitable means, such as locking nut 110. Valve 11' comprises a housing 111 defining an inlet channel 112 and an outlet channel 113 passing transversely through the housing. Housing 111 also defines central passage 114 and orifice 115 disposed between inlet channel 112 and outlet channel 113 with its center coinciding with the axial center of central passage 114. Removably secured to housing 111 by means of threads 116 is valve bonnet 117 which defines channel 118 adapted to receive valve stem 11 for guiding the said stem. Bonnet 117 also defines at the lower terminus of port 118 a threaded chamber 119 adapted to be threadedly engaged with the enlarged threaded portion 120 of valve stem 11. Valve stem 11 carries at its lower extremity valve tip 121.

When valve 11' is in the full open position the enlarged threaded portion 120 of valve stem 11 is in the uppermost portion of threaded chamber 119 and tip 121 is withdrawn from orifice 115, thus permitting fluid to flow freely through said orifice. When valve 11' is in the full closed position, enlarged threaded portion 120 is positioned in the vicinity of the lower extremity of threaded chamber 119 and valve tip 121 makes close contact with the walls of orifice 115, thereby closing the orifice to the passage of fluid therethrough. Positions intermediate between full closed and full open may be obtained by rotating valve stem 11. The threads carried by enlarged threaded portion 120 of valve stem 11 and the threads carried by threaded chamber 119 of bonnet 117 are at all times in engaging contact, thereby producing upward or downward motion of valve tip 121 when rotative motion is imparted to valve stem 11.

In order to secure geometrically progressive control of the area of orifice 115, tip 121 must have a definite calculable shape and the diameter at any point of the tip must bear the proper relation to the diameter of orifice 115 and to its position with respect to the orifice opening. This relationship is indicated in Fig. 7 when tip 121 is employed in valve 11' having an orifice 115 measuring ¼ inch in diameter. Valve tip 121 must be milled to the diameters shown at the indicated distances from the uppermost part of the tip and the diameters are then faired into each other to form a smooth surface. With the dimensions shown in Fig. 7 and when threaded portion 120 and the threads carried by chamber 119 of bonnet 117 are spaced so as to secure 18 threads per inch, the area of orifice 115 which is open to the flow of fluid therethrough is indicated in the table below.

*Open areas*

$A_1 = .0004$ sq. in.     $A_4 = .01488$ sq. in.
$A_2 = .00134$ sq. in.     $A_5 = .0276$ sq. in.
$A_3 = .00448$ sq. in.     $A_6 = .048$ sq. in.

The valves in the above table are, of course, calculable from the formula hereinbefore mentioned.

In the foregoing description of my apparatus it will be noted that I have described a system which employs compressed air for the required source of energy. It will be understood, however, that other types of energy may be used in the practice of my invention, together with equipment suitable to employ the kind of energy selected. For example, motors A and B and E and F have been described as air motors. It will be apparent that where a current supply is available, electrical motors or solenoids or a combination thereof may be used in place of the described air motors. It is also apparent that instead of using air, steam or any other suitable fluid may be used. I prefer to use air in the practice of my invention because of its availability and ease of control.

The drawings and description herein contained show and describe air vent valves C and D as the means employed for controlling reciprocation of motors A and B. It will be understood, however, that in the practice of my invention other means may be employed for this purpose. For example, direct electrical contacts, such as contact points or mercury switches, properly arranged may be used in place of air vents to control the reciprocation of motors A and B. Magnetic pickups or photoelectric cells may also be used. Here again I employ air in the preferred practice of my invention because of its availability and ease of control.

It will be readily appreciated that there has by this invention been provided an apparatus capable of carrying out all the objects and advantages hereinbefore revealed. My invention is particularly advantageous in that it provides an apparatus which permits the operator to leave the mechanism of U. S. Patent 2,489,449, for extended periods of time. My invention is also particularly advantageous in that it provides an apparatus which has little or no tendency to hunt as is usually the case with devices intended to control a given variable. My invention is also advantageous in that it is a simple control means which gives practically trouble-free operation.

The device of the present invention is disclosed in my copending application Serial No. 53,393, filed October 8, 1948, wherein it is claimed in combination with other devices, the combination being employed to fully control the operation of a drilling rig.

Having described my invention, what I claim as new is:

1. A control mechanism adapted to alter the position of a movable control member comprising, in combination, a first prime mover connected to the control member for moving the control member in a first direction, a second prime mover connected to the control member for moving the control member in a second direction, a first control means adapted to control the flow of the type of energy upon which the first prime mover operates, a member operatively connecting the first control means with energy supplied to the first prime mover, a second control means adapted to control the flow of energy of the type upon which the second prime mover operates, a member operatively connecting the second control means with energy supplied to the second prime mover, power means arranged to give said first and second control means periodic motion, an activating member adapted to assume a neutral position out of contact with the first and second control means and movable from the neutral position to a first position adapted to activate the first control means during a portion only of each cycle of its periodic motion and movable from the neutral position to a second position adapted to activate the second control means during a portion only of its cycle of periodic motion.

2. A control mechanism adapted to alter the position of a rotatable element in response to a signal, in combination, a first prime mover, a ratchet mechanism mechanically connecting said first prime mover with said rotatable element for moving said element through an arc in a clockwise direction upon the completion of a cycle by said first prime mover, a second prime mover, a ratchet mechanism mechanically connecting said second prime mover with said rotatable element for moving said element through an arc in a counter-clockwise direction upon the completion of a cycle by said second prime mover, means adapted to convey energy to said first and second prime movers, a first control means in communication with said first prime mover adapted to control the supply of energy thereto, a third prime mover carrying said first control means and arranged to move said first control means through a cycle, a second control means in communication with said second prime mover adapted to control the supply of energy thereto, a fourth prime mover carrying said second control means and arranged to move said second control means through a cycle, an activating mechanism mounted to assume a neutral position and movable to a first position to activate the said first control means through a portion only of each cycle of the said third prime mover and movable from a neutral position to a second position to activate the said second control means during a portion only of each cycle of the said fourth prime mover.

3. A control mechanism adapted to alter the position of a rotatable element in response to a signal, in combination, a first reciprocating motor, a ratchet mechanism mechanically connecting said first reciprocating motor with said rotatable element for moving said element through an arc in a clockwise direction upon the completion of a cycle by said first reciprocating motor, a second reciprocating motor, a ratchet mechanism mechanically connecting said second reciprocating motor with said rotatable element for moving said element through an arc in a counter-clockwise direction upon the completion of a cycle by said second reciprocating motor, means adapted to convey energy to said first and second reciprocating motors, a first control means in communication with said first reciprocating motor adapted to control the supply of energy thereto, a third reciprocating motor carrying said first control means and arranged to move said first control means through a cycle, a second control means in communication with said second reciprocating motor adapted to control the supply of energy thereto, a fourth reciprocating motor carrying said second control means and arranged to move said second control means through a cycle, an activating mechanism mounted to assume a neutral position and movable to a first position to activate the said first control means through a portion only of each cycle of the said third reciprocating motor and movable from a neutral position to a second position to activate the said second control means during a portion only of each cycle of the said fourth reciprocating motor.

4. A control mechanism adapted to alter the position of a rotatable element in response to a signal comprising, in combination, a first fluid activated reciprocating motor, a ratchet mechanism mechanically connecting said first fluid activated reciprocating motor with said rotatable element for moving said element through an arc in a clockwise direction upon the completion of a cycle by said first motor, a second fluid activated reciprocating motor, a ratchet mechanism mechanically connecting said second fluid activated reciprocating motor with said rotatable element for moving said element through an arc in a counter-clockwise direction upon the completion of a cycle by said second motor, means adapted to convey fluid under pressure to said first and second fluid activated reciprocated motors, a first control means in fluid communication with said first motor adapted to control the supply of fluid thereto, a third fluid activated reciprocating motor carrying said first control means and arranged to move said first control means through a cycle, a second control means in fluid communication with said second motor adapted to control the supply of fluid thereto, a fourth fluid activated reciprocating motor carrying said second control means and arranged to move said second control means through a cycle, an activating mechanism mounted to assume a neutral position and movable to a first position to activate the said first control means through a portion only of each cycle of the said third motor and movable from a neutral position to a second position to activate the said second control means during a portion only of each cycle of the said fourth motor.

5. A control mechanism adapted to alter the position of a rotatable element in response to a signal comprising, in combination, a first air activated reciprocating motor, a ratchet mechanism mechanically connecting said first air activated reciprocating motor with said rotatable element for moving said element through an arc in a clockwise direction upon the completion of a cycle by said first motor, a second air activated reciprocating motor, a ratchet mechanism mechanically connecting said second air activated reciprocating motor with said rotatable element for moving said element through an arc in a counter-clockwise direction upon the completion of a cycle by said second motor, means adapted to convey air under pressure to said first and second air activated reciprocating motors, a first control means in fluid communication with said first motor adapted to control the supply of air thereto, a third air activated reciprocating motor carrying said first control means and arranged to move said first control means through a cycle, a second control means in fluid communication with said second motor adapted to control the supply of air thereto, a fourth air activated reciprocating motor carrying said second control means and arranged to move said second control means through a cycle, an activating mechanism mounted to assume a neutral position and movable to a first position to activate the said first control means through a portion only of each cycle of the said third motor and movable from a neutral position to a second position to activate the said second control means during a portion only of each cycle of the said fourth motor.

6. A control mechanism adapted to alter the position of a rotatable element in response to a signal, in combination, a first prime mover, a ratchet mechanism mechanically connecting said first prime mover with said rotatable element for moving said element through an arc in a clockwise direction upon the completion of a cycle by said first prime mover, a second prime mover, a ratchet mechanism mechanically connecting said second prime mover with said rotatable element for moving said element through an arc in a counter-clockwise direction upon the completion of a cycle by said second prime mover, means adapted to convey energy to said first and second prime movers, a first control means in communication with said first prime mover adapted to control the supply of energy thereto, a third prime mover carrying said first control means and arranged to move said first control means through a cycle, a second control means in communication with said second prime mover adapted to control the supply of energy thereto, a fourth prime mover carrying said second control means and arranged to move said second control means through a cycle, an indicating needle registering the value of the variable to be controlled and mounted to assume a neutral position and movable to a first position in the path of said first control means to cause activation of said first control means through a portion only of each cycle of the third prime mover and movable from a neutral position to a second position in the path of said second control means to activate the said second control means through a portion only of each cycle of the said fourth prime mover.

7. A control mechanism adapted to alter the position of a rotatable element in response to a signal comprising, in combination, a first air activated reciprocating motor, a ratchet mechanism mechanically connecting said first motor with said rotatable element for moving said element through an arc in a clockwise direction upon the completion of a cycle by said first motor, a second air activated reciprocating motor, a ratchet mechanism mechanically connecting said second motor with said rotatable element for moving said element through an arc in a counter-clockwise direction upon the completion of a cycle by said second motor, a line fluidly connecting said first motor to a supply of compressed air under substantially constant pressure, a line fluidly connecting said second motor to a supply of compressed air under substantially constant pressure, a first bleeder valve in fluid communication with said first air activated reciprocating motor adapted to control the supply of air thereto, a third air activated reciprocating motor carrying said first bleeder valve and arranged to move said first bleeder valve through a cycle, a second bleeder valve in fluid communication with said second air activated reciprocating motor adapted to control the supply of air thereto, a fourth air activated reciprocating motor carrying said second bleeder valve and arranged to move said second bleeder valve through a cycle, a master valve adapted to supply air to said third motor while permitting air to exhaust from said fourth motor when the slidable element in said master valve is in a first position and to supply air to said fourth motor while permitting air to exhaust from said third motor when the slidable element in said master valve is in a second position, a pilot valve adapted to move the said slidable element in said master valve from its first position to its second position and from its second position to its first position in resonance with the reciprocation of the reciprocating elements of said third and fourth motors, a line fluidly connecting said third motor with said pilot valve, a line fluidly connecting said fourth motor with said pilot valve, an indicating needle registering the value to be controlled and mounted to assume a neutral position and movable to a first position in the path of a plunger affixed to the valve element of said first bleeder valve to activate said first bleeder valve through a portion only of each cycle of the said third motor and movable from a neutral position to a second position in the path of the plunger connected to the valve element of said second bleeder valve to activate the said second bleeder valve during a portion only of each cycle of the said fourth motor.

8. A control mechanism adapted to alter the position of a rotatable element in response to a signal comprising, in combination, an indicating needle registering a value to be controlled mounted to assume a neutral position and movable from the neutral position to a first position and from the neutral position to a second position, a first air activated reciprocating motor, a ratchet mechanism mechanically connecting said first motor with said rotatable element for moving said element through an arc in a clockwise direction upon the completion of a cycle by said first motor, a second air activated reciprocating motor, a ratchet mechanism mechanically connecting said first motor with said rotatable element for moving said element through an arc in a counter-clockwise direction upon the completion of a cycle by said second motor, a conduit fluidly connecting said first motor to a supply of compressed air under substantially constant pressure, a conduit fluidly connecting said second motor to a supply of compressed air under substantially constant pressure, a first bleeder valve fluidly connected with said first motor adapted to bleed air from said first motor during a portion of the cycle of a third motor when said indicating needle is in its first position, a second bleeder valve fluidly connected with said second motor adapted to bleed air from said second motor during a portion of the cycle of a fourth motor when said indicating needle is in its second position, a third air activated reciprocating motor carrying said first bleeder valve on the reciprocating element of said third motor and arranged to move said first bleeder valve through a cycle, a fourth air activated reciprocating motor carrying said second bleeder valve on the reciprocating element of said fourth motor and arranged to move said second bleeder valve through a cycle, a master valve fluidly connected with said third motor and said fourth motor, therein containing a slidable piston and adapted to supply air to said third motor while permitting air to exhaust from said fourth motor when said slidable piston is in a first position and adapted to supply air to said fourth motor while permitting air to exhaust from said third motor when said slidable piston is in a second position, a conduit fluidly connecting said master valve to a supply of compressed air under a substantially constant pressure, a pilot valve containing a slidable piston therein and adapted to supply air to said master valve to move the slidable element in said master valve alternately to its first position and its second position so as to cause the reciprocating elements in said third and fourth motors to reciprocate alternately, a conduit fluidly connecting said third motor with said pilot valve through a first port in said pilot valve, a conduit fluidly connecting said fourth motor with said pilot valve through a second port in said pilot valve, a conduit fluidly connecting said pilot valve with said master valve and adapted to move the slidable piston contained in said master valve to said first position, a conduit fluidly connecting said pilot valve with said master valve and adapted to move the slidable piston contained in said master valve to said second position, a conduit fluidly connecting said pilot valve to a supply of compressed air under substantially constant pressure.

9. A control mechanism adapted to control the flow of fluid through an orifice in a hydraulic conduit in response to a signal comprising, in combination, a rotatable element arranged to alter the area of flow through said orifice on rotation thereof; a first air actuated reciprocating motor mechanically connected to said rotatable element for rotating the rotatable element in a clockwise direction in increments finite in magnitude; a second air actuated reciprocating motor mechanically connected to said rotatable element for rotating the rotatable element in a counter-clockwise direction in increments finite in magnitude; a first bleeder valve mounted on a third air actuated reciprocating motor and arranged to be moved by said motor through a cycle; a second bleeder valve mounted on a fourth air actuated reciprocating motor and arranged to be moved by said motor through a cycle; an actuating mechanism mounted to assume a neutral position and movable to a first position to activate said bleeder valve through a portion only of each cycle of said third air actuated reciprocating motor and movable from a neutral position to a second position to activate said second bleeder valve during a portion only of each cycle of said fourth air actuated reciprocating motor; a first line fluidly connected with a pneumatic conduit containing air under pressure supplied from a source; a second line fluidly connecting said first bleeder valve and said first air actuated reciprocating motor with said first line; a first check valve arranged to permit air to flow from said first line to said second line and to prevent air from flowing from said second line to said first line; a third line fluidly connecting said second bleeder valve and said second air actuated reciprocating motor with said first line; a second check valve arranged to permit air to flow from said first line to said third line and to prevent air from flowing from said third line to said first line; and an adjustable valve in said first line positioned between the juncture of said first line with said pneumatic conduit and the juncture of said second and third lines with said first line.

10. A control mechanism adapted to control the flow of fluid through an orifice in a hydraulic conduit in response to a signal comprising, in combination, a rotatable element arranged to alter the area of flow through said orifice on rotation thereof; a first air actuated reciprocating motor mechanically connected to said rotatable element for rotating the rotatable element in a clockwise direction in increments finite in magnitude; a second air actuated reciprocating motor mechanically connected to said rotatable element for rotating the rotatable element in a counter-clockwise direction in increments finite in magnitude; a first bleeder valve mounted on a third air actuated reciprocating motor and arranged to be moved by said motor through a cycle; a second bleeder valve mounted on a fourth air actuated reciprocating motor and arranged to be moved by said motor through a cycle; an actuating mechanism mounted to assume a neutral position and movable to a first position to activate said first bleeder valve through a portion only of each cycle of said third air actuated reciprocating motor and movable from a neutral position to a second position to activate said second bleeder valve during a portion only of each cycle of said fourth air actuated reciprocating motor; a first line fluidly connected with a pneumatic conduit containing air under pressure supplied from a source; a second line fluidly connecting said first bleeder valve and said first air actuated reciprocating motor with said first line; a first check valve arranged to permit air to flow from said first line to said second line and to prevent air from flowing from said second line to said first line; a third line fluidly connecting said second bleeder valve and said second air actuated reciprocating motor with said first line; a second check valve arranged to permit air to flow from said first line to said third line and to prevent air from flowing from said third line to said first line; a first adjustable valve in said first line positioned between the juncture of said first line with said pneumatic line and the juncture of said second and third lines with said first line; a by-pass conduit fluidly connecting at both its ends with said hydraulic conduit and arranged in parallel with said orifice; an air actuated diaphragm valve in said by-pass conduit arranged to assume a first position, preventing the flow of hydraulic fluid through said by-pass conduit and to be moved from said first position to a second position, permitting fluid to flow through said by-pass conduit; a fourth line fluidly connecting the diaphragm of said air actuated diaphragm valve with said third line, said fourth line joining said third line at a point in said third line between said second check valve and said second air actuated reciprocating motor; a second adjustable valve in said fourth line; a fifth line fluidly connecting said fourth line with said pneumatic line, said fifth line joining said fourth line at a point in said fourth line between the diaphragm of said air actuated diaphragm valve and said second adjustable valve; a third adjustable valve in said fifth line; and a third check valve in said fourth line positioned between the juncture of said fourth line with said third line and the juncture of said fifth line with said fourth line, said check valve being arranged to permit air to flow from the diaphragm of said air actuated diaphragm valve into said third line and to prevent air from flowing from said third line into the diaphragm of said air actuated diaphragm valve.

11. A control mechanism adapted to control the flow of fluid through an orifice in a hydraulic conduit in response to a signal comprising, in combination, a rotatable element arranged to alter the area of flow through said orifice on rotation thereof; a first air actuated reciprocating motor mechanically connected to said rotatable element for rotating the rotatable element in a clockwise direction in increments finite in magnitude; a second air actuated reciprocating motor mechanically connected to said rotatable element for rotating the rotatable element in a counter-clockwise direction in increments finite in magnitude; a first bleeder valve mounted on a third air actuated reciprocating motor and arranged to be moved by said motor through a cycle; a second bleeder valve mounted on a fourth air actuated reciprocating motor and arranged to be moved by said motor through a cycle; an actuating mechanism mounted to assume a neutral position and movable to a first position to activate said first bleeder valve through a portion only of each cycle of said third air actuated reciprocating motor and movable from a neutral position to a second position to activate said second bleeder valve during a portion only of each cycle of said fourth air actuated reciprocating motor; a first line fluidly connected with a pneumatic conduit containing air under pressure supplied from a source; a second line fluidly connecting said first bleeder valve and said first air actuated reciprocating motor with said first line; a first check valve arranged to permit air to flow from said first line to said second line and to prevent air from flowing from said second line to said first line; a third line fluidly connecting said second bleeder valve and said second air actuated reciprocating motor with said first line; a second check valve arranged to permit air to flow from said first line to said third line and to prevent air from flowing from said third line to said first line; a first adjustable valve in said first line positioned between the juncture of said first line with said pneumatic line and the juncture of said second and third lines with said first line; a fourth line fluidly connecting said second line with said pneumatic conduit, said fourth line joining said second line at a point between said first bleeder valve and said first air actuated reciprocating motor; a fifth line in fluid communication with said pneumatic conduit; a first air actuated diaphragm valve positioned in said second line between the juncture of said fourth line with said second line and said first air actuated reciprocating motor, the diaphragm of said first air actuated diaphragm valve being in fluid communication with said fifth line, said valve being adapted to assume a closed position preventing the flow of air through said second line and movable to an open position permitting air to flow through said second line; a second air actuated diaphragm valve in said fifth line, the diaphragm of said second air actuated diaphragm valve being in fluid communication with said fourth line, said valve being adapted to assume a closed position preventing the flow of air through said fifth line and movable to an open position permitting air to flow through said fifth line; a third air actuated diaphragm valve in said hydraulic conduit, the diaphragm of said third air actuated diaphragm valve fluidly communicating with said fifth line between said second air actuated diaphragm valve and the diaphragm of said first air actuated diaphragm valve, said third air actuated diaphragm valve being adapted to assume a closed position preventing the flow of hydraulic fluid through said hydraulic conduit and movable to an open position permitting hydraulic fluid to flow through said hydraulic conduit; a second adjustable valve in said fourth line between the juncture of said fourth line with said second line and the diaphragm of said second air actuated diaphragm valve; a third adjustable valve in said fourth line between the juncture of said fourth line with said pneumatic line and the diaphragm of said second air actuated diaphragm valve; and a third check valve in said fourth line positioned between the juncture of said fourth line with said second line and the diaphragm of said second air actuated diaphragm valve, said third check valve being arranged to permit air to flow from the diaphragm of said second air actuated diaphragm valve into said second line and to prevent air from flowing from said second line into the diaphragm of said second air actuated diaphragm valve.

ROBERT R. CROOKSTON.

REFERENCES CITED

The following references are of record in the file of this patent:

UNITED STATES PATENTS

| Number | Name | Date |
|---|---|---|
| 1,426,718 | De Florez | Aug. 22, 1922 |
| 2,205,678 | Adams | June 25, 1940 |
| 2,385,409 | Gardner | Sept. 25, 1945 |